United States Patent

[11] 3,610,746

| [72] | Inventors | Tokusaburo Kakiuchi;<br>Hideaki Akiyama, both of Tokyo, Japan |
|---|---|---|
| [21] | Appl. No. | 841,753 |
| [22] | Filed | July 15, 1969 |
| [45] | Patented | Oct. 5, 1971 |
| [73] | Assignee | Kabushiki Kaisha Richoh<br>Tokyo, Japan |
| [32] | Priority | July 17, 1968 |
| [33] | | Japan |
| [31] | | 43/50349 |

[54] MOVIE PROJECTOR HAVING THE DEVICE FOR AUTOMATICALLY MOVING CARTRIDGE
3 Claims, 3 Drawing Figs.

[52] U.S. Cl................................................. 352/72
[51] Int. Cl................................................ G03b 23/02
[50] Field of Search........................................... 352/72, 78;
242/198, 199, 200; 226/174

[56] References Cited
UNITED STATES PATENTS

| 3,248,164 | 4/1966 | Wells............................. | 352/78 X |
| 3,429,519 | 2/1969 | Staar............................. | 352/78 X |
| 3,506,346 | 4/1970 | Kato............................. | 352/72 |

*Primary Examiner*—Louis R. Prince
*Assistant Examiner*—Joseph W. Roskos
*Attorney*—Burgess, Ryan and Hicks

ABSTRACT: Automatic retraction of a cartridge in a movie film projector having an indicator rod that rotates a release rod upon termination of projection whereby another rod is moved to allow the cartridge to move from a projection position to a rewind position. Pushbuttons are provided to actuate control linkage for rewinding the film and for stopping the film movement where desired.

3,610,746

MOVIE PROJECTOR HAVING THE DEVICE FOR AUTOMATICALLY MOVING CARTRIDGE

BACKGROUND OF THE INVENTION

The present invention relates to the device for automatically moving the cartridge of a movie projector.

In a movie projector in which insertable cartridge is used, the film passing through the projection gate within the cartridge inserted on the position of projection is pressed against the gate by a pressing board and at the same time it is connected to the film scraping nail and feed sprocket and/or sound sprocket. Therefore when film rewinding is carried out after the termination of projection, there is a problem that the film may be damaged, and at the same time the perforations may be broken. Therefore, it is preferable that the pressure of film against the projection gate should be released, and the connection of the film against the feed sprocket and/or sound sprocket should be disconnected.

Thus, the object of the present invention is to provide a device for automatically retracting the cartridge at the position of projection when the projection is terminated to release the pressure of film against the projection gate, the connection thereof to feed sprocket and/or sound sprocket is disconnected, and at the same time moving the cartridge to the rewinding position to carry out the film-rewinding.

SUMMARY OF THE INVENTION

The present invention provides the device for automatically moving a cartridge in a cartridge type movie projector of such a type that the reel driving member retracts from the takeup or rewinding reel when projection is terminated or rewinding is terminated by the operation of the signal rod of insertable cartridge. This is provided by a push rod for pushing the cartridge in the direction of the slit of the projector by connecting the same to the cartridge inserted in the cartridge slit of the projector. The connecting rod is capable of being connected to an opening formed on the side of the cartridge wherein said connecting rod is rotatably provided on the side of said slit, and the release rod is rotatably provided on the side of the slit as well, wherein one arm thereof is connectable to the signal rod of the cartridge. When the cartridge is inserted on the position of projection, the connecting rod is connected to the opening to restrain the cartridge on said position against the force of the push rod, and when the projection is terminated, the connecting rod is driven by the signal rod through the release rod, to release the connection thereof to the cartridge. The cartridge can then be moved to the rewinding position from the position of projection by the pushing force of the push rod.

Other objects and features of this invention will be clarified in the detailed explanation in accordance with the attached diagrams.

DESCRIPTION OF THE PREFERRED EMBODIMENT

Figure 1:
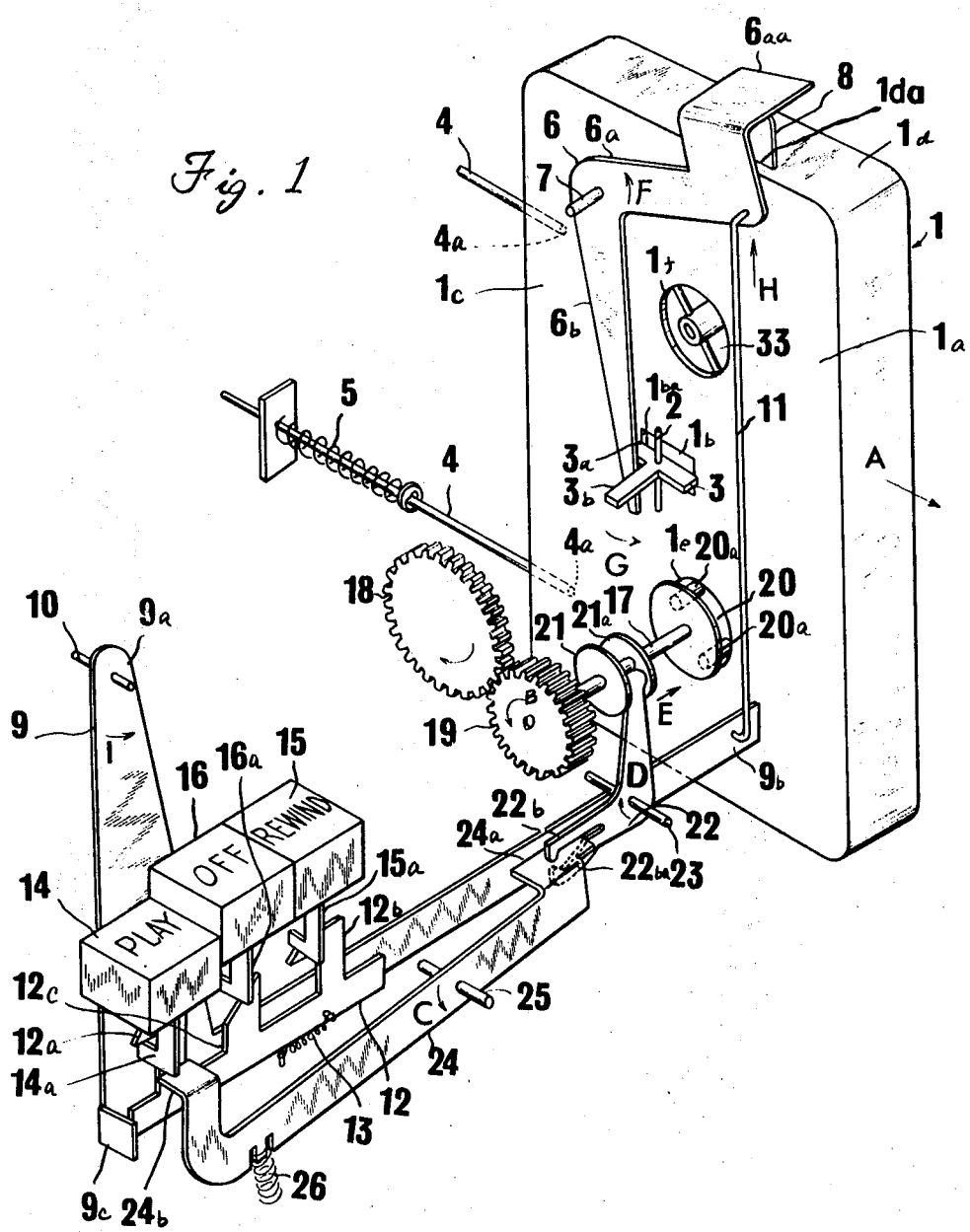
FIG. 1 is a perspective view of the main portion showing the state of a cartridge type projector when the projection is terminated and the movie projector is turned off by removing a part of a component member.
Figure 2:
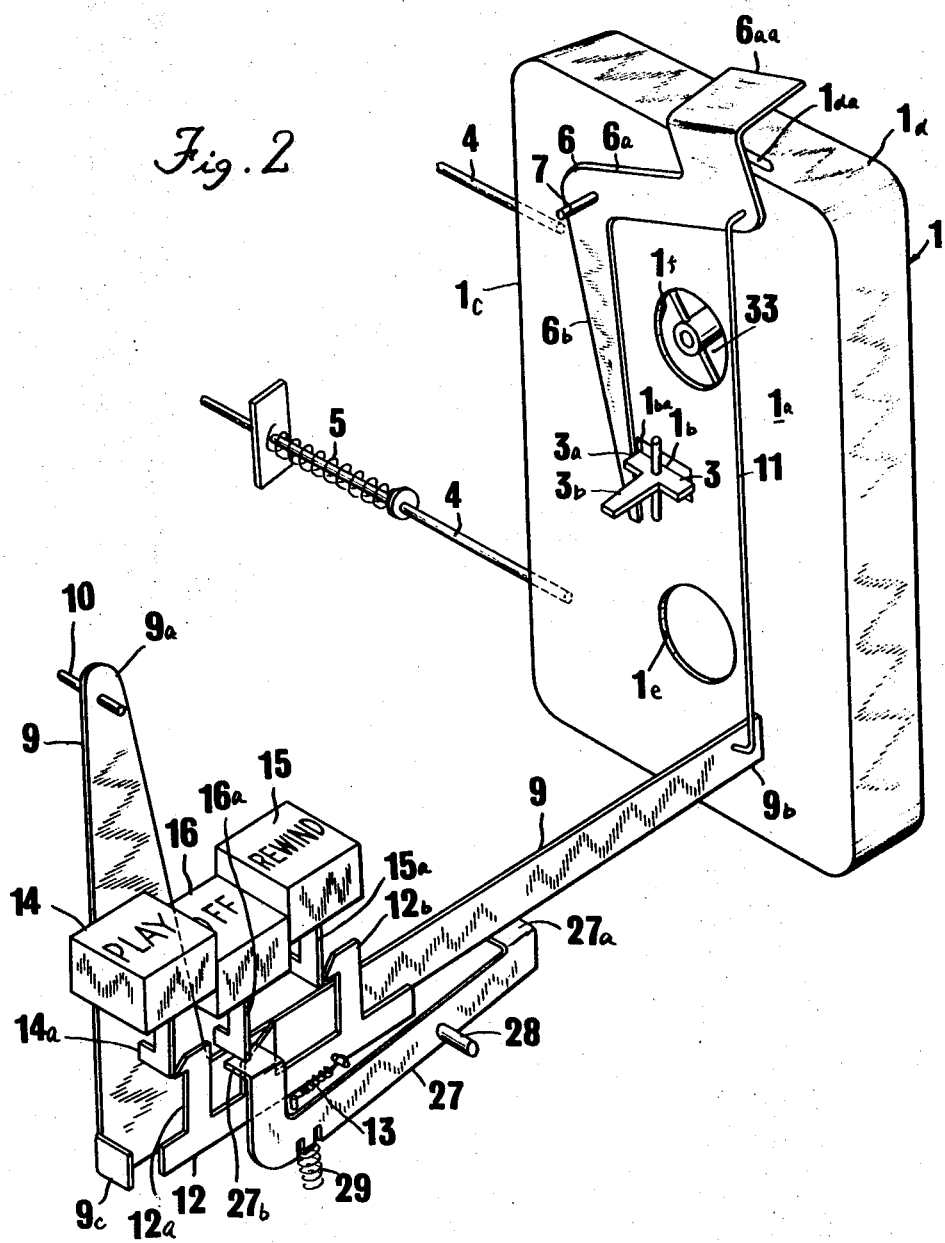
FIG. 2 is a perspective view of the cartridge type movie projector showing the state when the cartridge in a projecting state is turned off as in FIG. 1.

A check rod 3 in the shape of the letter T is rotatably provided on the fixed portion of the movie projector on the side of the insertion hole, i.e., of the cartridge 1 by means of the shaft 2, and a spring (not shown) is connected thereto to provide a clockwise spring force (see FIG. 1 and 2). Two push rods 4 freely movable in the running direction of the cartridge as guided into the fixed portion of the projector, are provided in such a manner that they can be driven by the spring 5 in the direction of cartridge, and when the cartridge 1 enters into the insertion hole by a predetermined distance, the ends 4a of the push rods 4 abut the front end surface 1c of the cartridge 1.

When the cartridge 1 is inserted as far as the position of projection, the rod 3 is rotated clockwise, and the front end 3a thereof abuts against the front wall 1ba of an opening 1b formed on the sidewall 1a of said cartridge 1 so that the cartridge 1 is restrained in the position of projection against the pushing force of the push rods 4 by means of the spring 5. When the restraint is released, the cartridge 1 is moved in the direction as is shown by an arrow A, by the pushing force of the push rod 4, and it is turned back to the rewinding position.

A two-armed first releasing rod 6 is is rotatably mounted on the fixed portion by means of a shaft 7. It is so devised that when the film wound on one reel within the cartridge 1, is taken up on the other reel, the bent end portion 6aa of one arm 6a of the first releasing rod 6 can be connected to the signal rod 8 of the conventional structure for projecting outwardly from the slit 1da formed on the upper surface 1d of the cartridge. The end portion of the other end arm 6a of the first releasing rod 6 abuts to the arm 3b of the check rod 3.

A second releasing rod 9 in the shape of the letter L is rotatably mounted on the fixed portion by the shaft 10, and the other end 9b and the arm 6a of the first releasing rod 6 are movably connected by means of a connecting rod 11. A moving rod 12 having hooks 12a and 12c and a projection 12b having a slanting edge is movably mounted on the fixed portion in such a manner that the moving rod 12 can be approximately horizontally moved, and a spring 13 is provided between the same and the fixed portion to direct a spring force to the left as shown in FIG. 1, in such a manner that the left end of the moving rod 12 can be always abutting the bent portion 9c formed at the curve of the second releasing rod 9.

A projecting button 14, rewinding button 15, and stop button 16 are provided on the fixed portion independently in such a manner that they can be moved freely in the vertical direction, and they are spring biased upwardly so that they are always in predetermined raised positions.

When the projection button 14 (or rewinding button 15) is pushed down, the hook 14a or 15a engages with a lower surface of the hook 12a or 12b so that the projection button 14a (or rewinding button 15) is restrained at the down position as shown by hooks 12a and 14a in FIG. 1 and a driving source of the projector (not shown) is switched on. When the stop button 16 is pushed down, the hook 16a pushes against the slanting surface of the hook 12c which moves the moving rod 12 to the right side direction against the spring 13. When the restraint between the hooks 12a and 14a (or the hooks 12b and 15a) is released, the projection button 14 or the rewinding button 15) returns to its original position and the driving source is turned off to stop the operation. When either the projection button 14 or the rewinding button 15 is at the down position and the other button is pushed down, then the hook 15a or 14a pushes the slanting surface of the hook 12b or 12a which moves the moving rod 12 to the right side direction and one of the restraints is released.

A takeup shaft 17 is supported movably and rotatably on the fixed portion of the projector, and the gear 19 driven by the driving source of the projector is fixed through the gear 18 at one end of the takeup shaft 17. The width of the teeth of the gear 19 is made wide enough not to have the gearing thereof against the gear 18 disconnected by the movement of the takeup shaft 17. On the other end of the takeup shaft 17, a takeup ratchet plate 20 having pins 20a, 20a capable of being geared against the reel (not shown) within the cartridge 1 through the hole 1e of the side surface 1a, is fixed. A shift plate 21 having ring form groove 21a is fixed between the takeup clutch plate 20 and the gear 19.

A two-armed takeup shifter 22 is rotatably mounted on the fixed portion by means of the shaft 23. The end of one arm 22a of the takeup shifter 22 is located in a groove 21a formed by spaced apart ring plates of the shift plate 21, and forked portion 22ba is formed on the end portion of the other arm 22b.

A takeup shifter driving rod 24 is rotatably mounted on the fixed portion by means of a shaft 25, and a compressed spring 26 is provided between the rod 24 and the fixed portion to provide a clockwise spring force thereto as would appear in FIG. 1. The one end bent portion 24a of the takeup shifter driving rod 24 is supported on the forked portion 22ba while the other end bent portion 24b is abutting the lower end of the leg 14a of the projection button 14.

As shown in FIG. 2, a driving rod 27 is rotatably mounted on the fixed portion by means of a shaft 28, and a spring 29 is provided between the rod 27 and the fixed portion to provide a clockwise spring force thereto. The upper surface of the one end bent portion 27a abuts the middle lower side between the end 9b of the second releasing rod 9 and the bent portion 9c, and the other end bent portion 27b is abutting the lower end of the leg 16a of the stop button 16.

Figure 3:
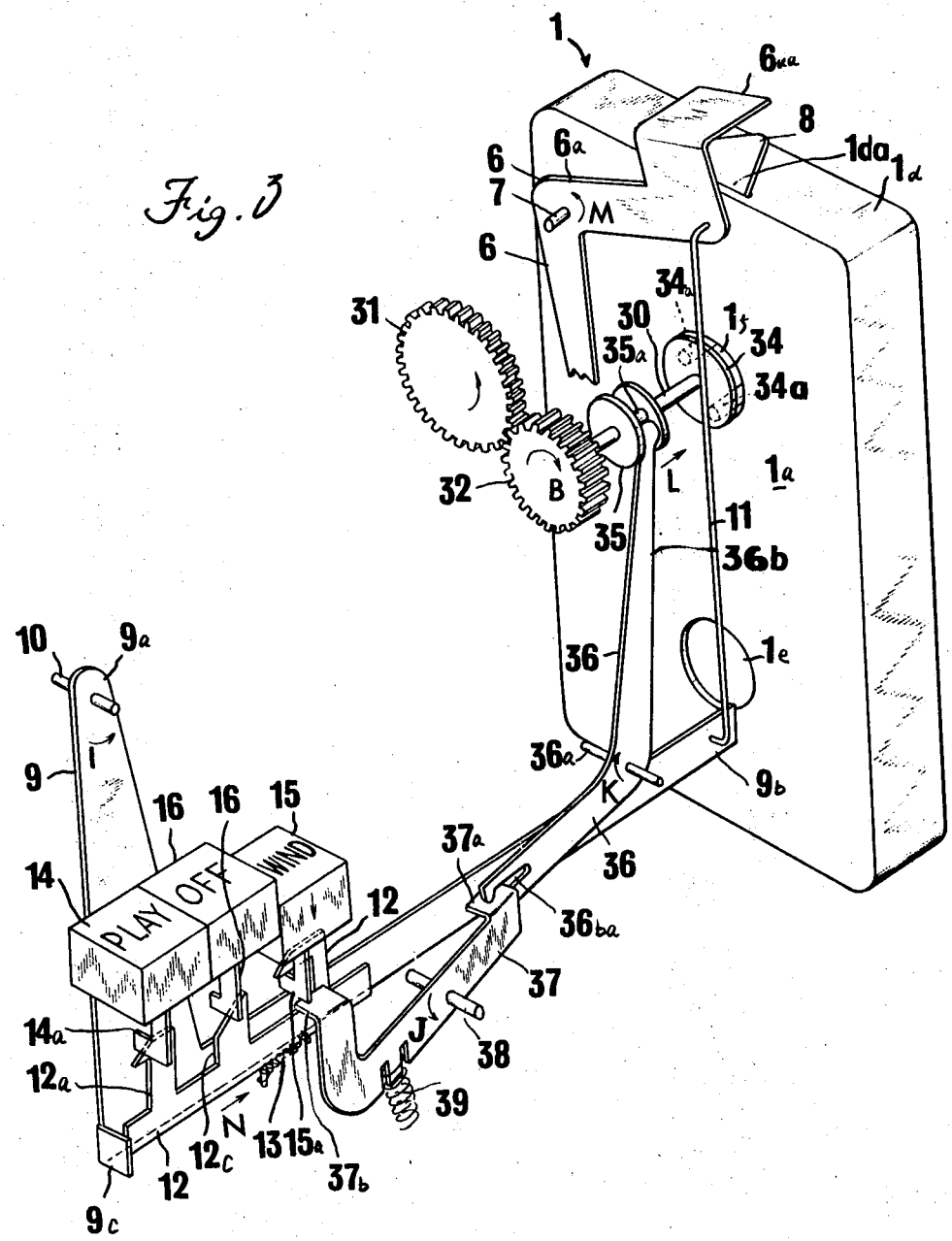
FIG. 3 is a perspective view showing the state of the same cartridge type movie projector in the rewinding state when it is turned off as in FIG. 1.

A takeup or rewinding shaft 30 as shown in FIG. 3 is rotatably and movably supported on the fixed portion of the projector, and a gear 32 driven by the driving source of the projector is fixed on one end of said rewinding shaft 30 through the gear 31. The width of the teeth of the gear 32 is made wide so that the gearing thereof against the gear 31 can not be disconnected by the movement of the rewinding shaft 30. On the other end of the rewinding shaft 30, a rewinding clutch plate 34 having pins 34a, 34a capable of being geared against a reel 33 rotatable within said cartridge through the hole 1f of the side surface 1a (see FIG. 2) when the cartridge 1 is turned back to the rewinding position, is fixed. A shift plate 35 having two ring plates with a groove 35a formed therebetween is fixed between the rewinding clutch plate 34 and the gear 32.

A two-armed rewinding shifter 36 is rotatably mounted on the fixed portion, and the end of one arm 36b of the rewinding shifter 36 is positioned in the groove 35a of the rewinding shifter 36. Forked portion 36ba is formed at the end of the other arm 36b of the rewinding shifter 36. A rewinding shifter driving rod 37 is rotatably mounted on the fixed portion by means of a shaft 38, and a spring 39 is provided between rod 37 and the fixed portion to provide a clockwise spring force as would appear in FIG. 3. One end bent portion 37a of the rewinding shifter driving rod 37 is supported on the forked portion 36ba, and the other end bent portion 37b is abutting the lower end of the hook 15a of the rewinding button 15.

The cartridge 1 is inserted into the projector, and it is brought up to the position of projection against the pushing force of the push rod 4 where the cartridge 1 is restrained by the check rod 3. The bent portion 6aa of the first releasing rod 6 is thereupon placed slightly above the slit 1da of the upper surface 1d of the cartridge 1. The projection button 14 is pushed down in this state, the driving source of the projector is energized, and the takeup shaft 17 is rotated in the direction as is shown by the arrow B in FIG. 1. The hook 14a pushes the bent portion 24b of the takeup shifter drive rod 24 against the force of the spring 26 to rotate the rod 24 in the direction shown by the arrow C. The rod 22 is rotated counterclockwise in the direction shown by the arrow D by the connection of the bent portion 24a and the forked portion 22ba of the takeup shifter 22. The takeup shaft 17 is moved in the direction shown by the arrow E through the takeup shift plate 21 to have the pins 20a, 20a of the clutch plate 20 geared into the reel within the cartridge to rotate the reel, and the film starts to be taken up. When the projection button 14 is further lowered, the hook 14a is restrained by the hook 12a of the moving rod 12 and when the pushing down of the projection button 14 is released, the state in which the takeup reel is driven by hook 12a engaging hook 14a, projection is carried out.

When it is desired to stop the projection, the stop button 16 is pushed down, and the leg 16a of the stop button 16 has the moving rod 12 moved to the right to release the restraint of the hook 14a of the projection button 14. The projection button 14 thereupon returns back to the raised position to deenergize the driving source of the projector, and the second release rod 24 is rotated clockwise due to spring 26. The takeup shifter 22 is thereupon rotated counterclockwise, and the pins 20a of the clutch plate 20 are released from the reel. At the same time, the leg 16a of said button 16 pushes the bent portion 27b of the rod 27 against the force of the spring 29 to rotate the rod 27 counterclockwise, and the bent portion 27a thereof drives the second release rod 9 in a counterclockwise direction so that the first release rod 6 is rotated counterclockwise.

The end of the arm 6b of the first release rod 6 pushes the arm 3b of the check rod 3 to rotate the check rod 3 counterclockwise. Therefore the connection of the check rod 3 and the opening 1b i.e., the restraint of the cartridge 1 is released at the position of projection, and the cartridge 1 is pushed by the pushing force of the push rod 4, to be moved in the direction shown by the arrow A and it is returned to the winding position. At this position, the cartridge 1 is restrained by an appropriate checking device such as spring type click stop or the like.

It is possible to remove the cartridge 1 directly from the rewinding position, and it is also possible to return to projection by pushing down the projection button 14 and pushing the cartridge 1 into the position of projection again. In addition, it is also possible to start projection by pushing down the projection button 14 and pushing the cartridge 1 to the position of projection after stopping a part or the whole of the projected film at a desirable scene by pushing down the rewinding button 15 as is explained hereinafter.

When the projection of the film within the cartridge 1 is terminated and the film is perfectly taken up on the takeup reel, the signal rod 8 of the cartridge 1 is projected outwardly from the slit 1da to be connected to the bent portion 6aa of the first release rod 6. The bent portion 6aa is pushed out, and the rod 6 is rotated in the direction shown by the arrow F, and the following series of operations are carried out. Namely, the end of the arm 6b of the first release rod 6 pushes the arm 3b of the check rod 3 to rotate the check rod 3 in the direction shown by the arrow G, and the restraint of the cartridge 1 on the position of projection is released. The cartridge 1 is moved to the rewinding position by the pushing force of the push rods 4, and at the same time the connecting rod 11 is moved in the direction shown by the arrow H by the movement of the first release rod 6, and therefore the second release rod 9 is rotated in the direction shown by the arrow I. The bent portion 9c thereof moves the moving rod 12 to the right, and the restraint of the projection button 14 is released, and it is moved back to the raised position and the energization of the driving source of the projector is disconnected. The drive rod 24 of the takeup shaft 17 is rotated clockwise, and the takeup shifter 22 is rotated counterclockwise, and the takeup shaft 17 is moved to the left. The clutch pins 20a, 20a are removed from the reel, and the film rewinding preparation can be done.

In the above-mentioned state, when the rewinding button 15 is pushed down in the direction shown by the arrow, the driving source of the projector is energized to rotate the gear 32 in the direction shown by the arrow Ba, and at the same time the hook 15a rotates the shifter driving rod 37 in the direction shown by the arrow J against the force of the spring 39, and the rewinding shifter 36 is rotated in the direction shown by the arrow K, and therefore the rewinding shaft 30 is rotated in the direction shown by the arrow L to gear the pins 34a, 34a of the clutch plate 34 into the rewinding reel 33 and the rewinding reel 33 is rotated to start the rewinding operation.

When the film rewinding operation is terminated, the signal rod 8 is projected from the slit 1da of the cartridge 1, to rotate the first release rod 6 in the direction shown by the arrow M, and therefore the second release rod 9 is rotated in the direction shown by the arrow I through the connecting rod 11 bent portion 9c thereof moves the moving rod 12 in the direction shown by the arrow N to release the restraint against the hook 15a, and therefore the rewinding button 15 is moved back to the raised position to disconnect the energization of the driving source of the projector. At the same time, the rewinding shifter driving rod 37 is turned clockwise, and interlockingly the rewinding shifter 36 is turned counterclockwise. The rewinding shaft 30 is moved to the left side, and the pins 34a, 34a of the clutch plate 34 are removed from the rewinding reel 33. The cartridge 1 can be removed from the projector, or inserted into the position of projection again to carry out the show.

In the above given embodiments, the first release rod 6 is mechanically related to the takeup means and rewinding means, and the clutch is retracted from the reel at the time when the restraint of cartridge 1 is released, but it is also possible to retract the clutch plate, i.e., the clutch from the reel by using electric or electromagnetic effect by connecting the signal rod 8 to the electric or electromagnetic means. On the other hand, it is possible to retract the clutch from the reel by moving the rewinding shaft 17 when the projection is terminated by directly or indirectly relating the operation of the first release rod 6 or the connecting rod 3 to the rewinding shaft 17. There are various kinds of devices for retracting the driving members of takeup and rewinding reels therefrom by disconnecting the energization of the driving source of the projector by making the operation of the signal rod 8 as the signal source. On the other hand, it is not necessary to restrict the number of the push rod 4 to be two, but one or more than two push rods can be provided, and in regard to the form of the opening 1b, it can be a rectangle, triangle, half-circle or it can be such a form as to have an inclined bottom.

We claim:

1. A cartridge type movie projector wherein a cartridge is insertable and movable between projection and rewinding positions comprising
    a cartridge having a first opening in a top surface thereof and a second opening in a side surface thereof;
    a signal means is located within said cartridge and adapted to project outwardly through said first opening upon termination of projection;
    a two-armed lever means with end portions pivotally mounted on said cartridge and having one end portion adapted to be contacted by said projecting signal means for rotation with respect to said cartridge;
    a check rod projecting out from said second opening for holding said cartridge in the projection position and adapted to be contacted by the other end portion of said two-armed lever for movement out of said position;
    biasing means forcing said cartridge from the projection position to the rewinding position upon movement of said check rod;
    a plurality of pushbuttons including a projection button and a rewinding button;
    said two-armed lever having an intermediate portion;
    a release rod actuable by the depressing of one of said buttons;
    a connecting rod connecting one end of said release rod with said intermediate portion;
    a power source for driving said film;
    connectable and disconnectable means for connecting said power source to drive said film in a predetermined direction;
    said projection button being depressable to connect said power source through said connectable means for driving said film in one predetermined direction; and
    said rewinding button being depressable when said cartridge has been moved to said rewinding position thereby releasing the depression of said projection button and allowing the connectable means to drive said film in a direction opposite to said one direction.

2. A movie projector according to claim 1 in which a hook lever means is positioned below said button and adapted to be engaged therewith for restraining an individual button in a depressed position, and said release rod abuts said hook lever means for selective actuation thereof to release said buttons from said depressed position.

3. A movie projector according to claim 1 in which said connectable and disconnectable means comprise a pair of clutches operated by individual shifter levers, and individual drive rods are associated with said buttons to be actuated thereby and operate said shifter levers respectively to provide the film drive in the desired direction.